(12) United States Patent
Park

(10) Patent No.: US 7,236,145 B2
(45) Date of Patent: Jun. 26, 2007

(54) CRT DISPLAY DEVICE AND METHOD

(75) Inventor: Hyung-suk Park, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 10/832,350

(22) Filed: Apr. 27, 2004

(65) Prior Publication Data

US 2005/0001790 A1    Jan. 6, 2005

(30) Foreign Application Priority Data

Jul. 3, 2003    (KR) .................... 10-2003-0044899

(51) Int. Cl.
*G09G 1/06* (2006.01)
(52) U.S. Cl. .......................... 345/11; 345/13
(58) Field of Classification Search ............ 345/10, 345/11, 12, 13, 14, 15; 348/730
See application file for complete search history.

(56) References Cited

U.S. PATENT DOCUMENTS

| | | |
|---|---|---|
| 5,304,898 A | 4/1994 | Kataoka et al. |
| 5,430,596 A | 7/1995 | Hamaguchi et al. |
| 5,952,795 A | 9/1999 | Kofune et al. |

FOREIGN PATENT DOCUMENTS

| | | |
|---|---|---|
| JP | 57-2165 | 1/1982 |
| JP | 4-150379 | 5/1992 |
| JP | 9-30779 | 2/1997 |
| KR | 01-24440 | 9/1998 |
| KR | 1999-0028838 | 7/1999 |

OTHER PUBLICATIONS

Korean Office Action for Korean Applicaton 10-2003-0044899.

*Primary Examiner*—Richard Hjerpe
*Assistant Examiner*—Jean Lesperance
(74) *Attorney, Agent, or Firm*—Staas & Halsey LLP

(57) ABSTRACT

A CRT (Cathode Ray Tube) display device, and method, having a FBT (Fly Back Transformer) with a conductive coil, and a step-up circuit supplying a predetermined power to the FBT The CRT includes a high voltage sensor sensing a voltage applied to the step-up circuit and a controller receiving the voltage outputted from the FBT and controlling an input voltage of the step-up circuit to be dropped when the received voltage from the FBT is higher than a predetermined dangerous voltage. With this configuration, the present invention provides the CRT display device that decreases an input voltage of a step-up circuit to operate normally and to prevent elements of the step-up circuit from being destroyed.

18 Claims, 4 Drawing Sheets

CRT DISPLAY DEVICE AND METHOD

CROSS-REFERENCE TO RELATED APPLICATIONS

This application claims the benefit of Korean Patent Application No. 2003-44899, filed Jul. 3, 2003, in the Korean Intellectual Property Office, the disclosure of which is incorporated herein by reference.

BACKGROUND OF THE INVENTION

1. Field of the Invention

The present invention relates to a Cathode Ray Tube (CRT) display device, and method. More particularly, the present invention relates to a CRT display, with a step-up circuit, and method for the same.

2. Description of the Related Art

In general, a Fly Back Transformer (FBT) of a CRT display outputs up to 26 kV. Generally, there are two types of high voltage regulation circuits available to stably supply high voltage. One circuit is a separable regulating circuit, separately regulating a high voltage and a deflection coil (Deflection Yoke, DY), and the other circuit is an integrated regulating circuit, regulating the high voltage and the deflection coil together.

FIG. 1 is an integrated regulating circuit of a conventional CRT display.

As illustrated in FIG. 1, the integrated regulating circuit includes a FBT 110, a horizontal deflection coil 120, a deflection signal controller 130, and a step-up circuit 140.

The FBT 110 has a primary conductive coil 111 and a secondary conductive coil 112. The secondary conductive coil 112 has a comparatively greater turn ratio than the primary conductive coil 111, and increases the voltage applied to the primary conductive coil 111. The voltage at the secondary conductive coil 112 is then supplied to a cathode of the CRT.

The horizontal deflection coil 120 is combined with an end of the primary conduction coil 111 of the FBT. By having a ramped current, the horizontal deflection coil 120 deflects an electron beam, generated by an electron gun, so that the electron beam is caused to scan across a display tube of the CRT, from corner to corner.

The deflection signal controller 130 includes a transistor Q3, pull-up resistors R1 and R2, and a damper-diode D2. The damper-diode D2, typically embodied by a silicon diode, is used to constrain a free oscillation generated after a flyback period of the ramped current waveform of the horizontal deflection coil 120. The transistor Q3 uses a BJT (Bipolar Junction Transistor) and switches on and off the voltage applied to the horizontal deflection coil 120, responding to a control signal applied to a base terminal thereof.

A primary purpose of the deflection signal controller 130 is to drive the horizontal deflection coil 120. The horizontal deflection coil 120 has to be correctly charged to a proper current level to enable a scanning of the electron beam to proceed from left to right on the screen. A control of the current strength, in the horizontal deflection coil 120, controls the deflection of the horizontal deflection coil 120 and enables the scanning to proceed horizontally. The horizontal deflection coil 120 generates a magnetic field and causes the electron beam to be deflected by applying a magnetic force to the electron beam. Horizontal-size (H-size) and horizontal-linearity (H-linearity), respectively, control the degree of deflection and the speed of the deflection. The step-up circuit 140 supplies power to the horizontal deflection coil 120, to enable a continuous deflection operation.

The step-up circuit 140 may include a BJT (Bipolar Junction Transistor) Q1, a MOSFET (Metal Oxide Semiconductor Field Effect Transistor) Q2, a diode D1, pull-up resistors R3 and R4, a capacitor C1, and an inductor L1.

A signal generated according to a PWM (Pulse Width Modulation) signal, applied to the BJT Q1, is sequentially applied to a gate terminal of the MOSFET Q2, as a control signal switching the MOSFET Q2. The PWM signal applied to the BJT Q1 is a waveform designed to alternate between a zero duty level and a half duty level. When the MOSFET Q2 is in an off state, that is, when the PWM signal inputted to the BJT Q1 is in the zero duty level, the capacitor C1 is charged with a voltage applied to a drain terminal of the MOSFET Q2. On the other hand, when the PWM signal is in the half duty level, the voltage charging the capacitor C1 is increased by an electromotive force stored in the inductor L1. When the voltage (Vcc) applied to the drain terminal of the MOSFET Q2 is 50V, a voltage of the capacitor C1 is 50V if the PWM signal is in the zero duty level, but the voltage of the capacitor C1 increases to 160V or 180V if the PWM signal is in the half duty level.

A main role of the pull-up resistor R3 is to inform an IC (integrated circuit), controlling the deflection, that the MOSFET Q2 is in an on-state. When current is flowing through the pull-up resistor R3, during the on-state of MOSFET Q2, the voltage at Bsense is increased. Thus, the deflection controlling IC senses the voltage at Bsense and controls the same to be a high voltage by changing the on/off state of the MOSFET Q2.

The step-up circuit 140, focusing on the MOSFET Q2, is efficient for controlling the high voltage. The voltage at the capacitor C1 is flexibly changed based on a frequency varying from 31 kHz to 70 kHz, for example, as well as a maxmum/minmum load amount, of the electron beam, thereby compositively changing the high voltage.

The magnetic force applied to the inductor L1 is dependent on the length of the on-duty state of MOSFET Q2, e.g., the magnetic force will increase as the length of the on-duty state increases. Thus, the voltage in the capacitor C1 can be changed by the MOSFET Q2 being in the on-duty state. The voltage in the capacitor C1 is conducted to the primary coil 111 of the FBT 110 and supplied to the horizontal deflection coil 120.

Such a CRT device is widely used in TV picture tubes, computer monitors, and the like. A relay is also used to control a system of the above CRT devices, though the relay may be harmful to the system because of a chattering noise, a time delay, and so on.

Referring to FIG. 1, the conventional CRT display devices have several problems, such as the horizontal deflection signal controller 130 suddenly stopping because of an error from the relay, being an inefficient system environment, and potentially causing the PWM signal of the step-up circuit 140 to be continuously applied. Consequently, the electromotive force stored in the inductor C1 may continuously increase, and the current flowing through the MOSFET Q2 may rise to a dangerous level, such that the MOSFET Q2 may actually be destroyed.

SUMMARY OF THE INVENTION

Accordingly, it is an aspect of the present invention to provide a CRT (Cathode Ray Tube) display device, and method, that decreases an input voltage of a step-up circuit, to perform regular scanning operations and to prevent elements of the step-up circuit from being destroyed.

Additional aspects and/or advantages of the invention will be set forth in part in the description which follows and, in part, will be obvious from the description, or may be learned by practice of the invention.

To accomplish the above and/or other aspects and advantages, embodiments of the present invention provide a Cathode Ray Tube (CRT) display, including a Fly Back Transformer (FBT) with a conductive coil, a step-up circuit supplying a predetermined power to the FBT, a high voltage sensor sensing a voltage output from the step-up circuit, and a controller receiving the sensed voltage and controlling an input voltage of the step-up circuit to be dropped when the sensed voltage is higher than a predetermined dangerous voltage.

The CRT display may further include a deflection signal output applied a predetermined deflection voltage from the step-up circuit and a deflection signal controller controlling an application of the applied deflection voltage from the step-up circuit to the deflection signal output, wherein the controller drops the input voltage applied to the step-up circuit when the step-up circuit continuously supplies power to the FBT without the deflection signal controller controlling application of the applied deflection voltage to the deflection signal output.

Further, the controller may controls the CRT display to be operated in a Display Power Management Signaling (DPMS) mode when the sensed voltage is higher than the dangerous voltage, to drop the input voltage applied to the step-up circuit. In addition, the controller may output a predetermined control signal to the deflection signal controller to enable the deflection signal controller to control the deflection voltage applied to the deflection signal output, thereby dropping the input voltage to the step-up circuit, when the sensed voltage is higher than the dangerous voltage.

To accomplish the above and/or still another aspect and advantage, embodiments of the present invention provide a method of controlling a Cathode Ray Tube (CRT) display, including sensing a voltage output from a step-up circuit of a Fly Back Transformer (FBT), and controlling an input voltage of the step-up circuit to be dropped when the sensed voltage is higher than a predetermined voltage.

The method may further include applying a deflection voltage from the step-up circuit to a deflection signal output to control an electron beam deflection of the CRT, wherein the input voltage applied to the step-up circuit is dropped when the step-up circuit continuously supplies power to the FBT without a use, by the deflection signal output, of the deflection voltage from the step-up circuit being controlling by a deflection signal controller, controlling the deflection signal output.

Further, the CRT display to be operated in a Display Power Management Signaling (DPMS) mode when the sensed voltage of the output of the step-up circuit is higher than the predetermined voltage, to drop the input voltage applied to the step-up circuit. In addition, a deflection signal controller may control usage, by a deflection signal output, of a deflection voltage, from the step-up circuit, by dropping the input voltage to the step-up circuit, when the sensed voltage of the output of the step-up circuit is higher than the predetermined voltage.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
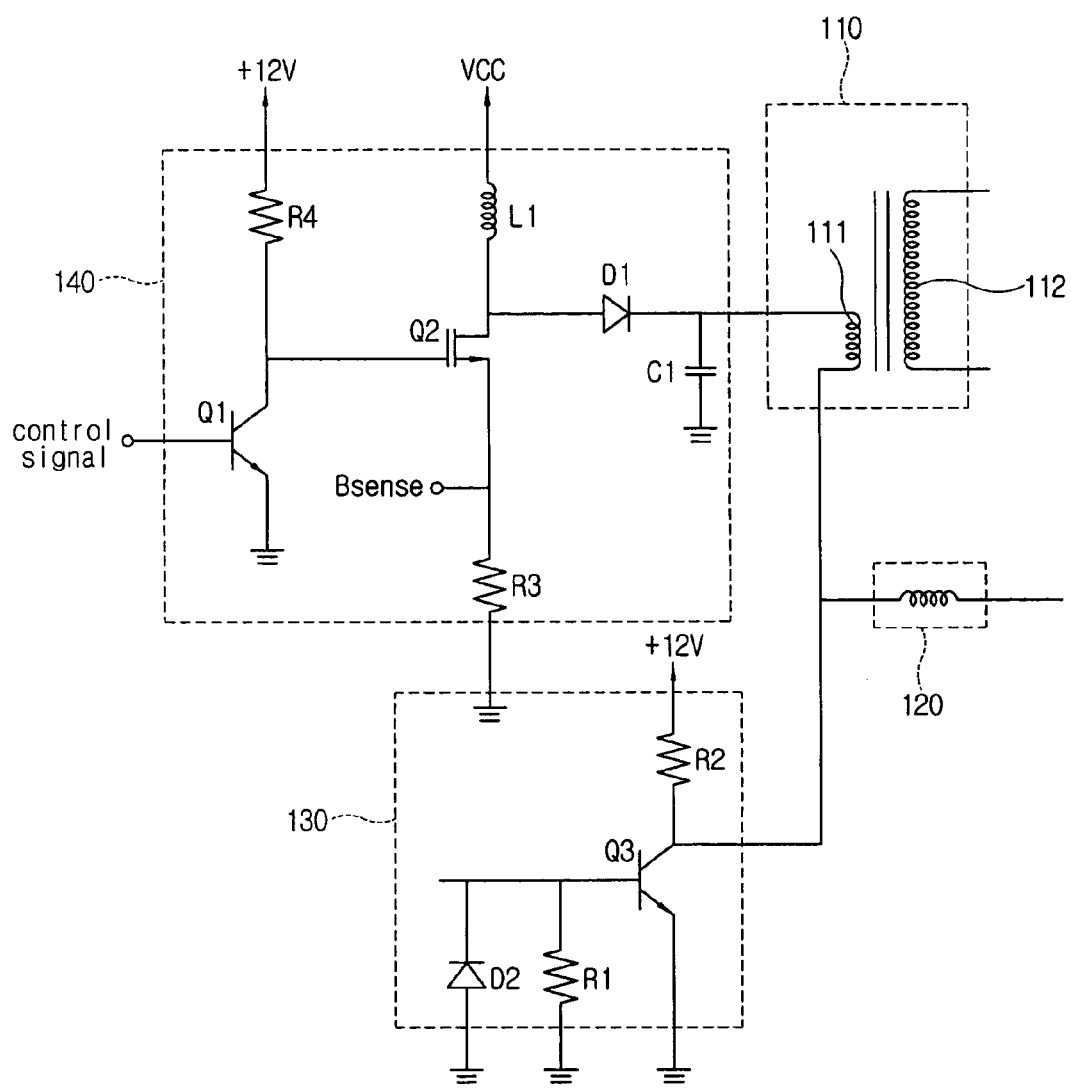
FIG. 1 illustrates a circuit diagram of an integrated regulating circuit of a conventional CRT (Cathode Ray Tube) display.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
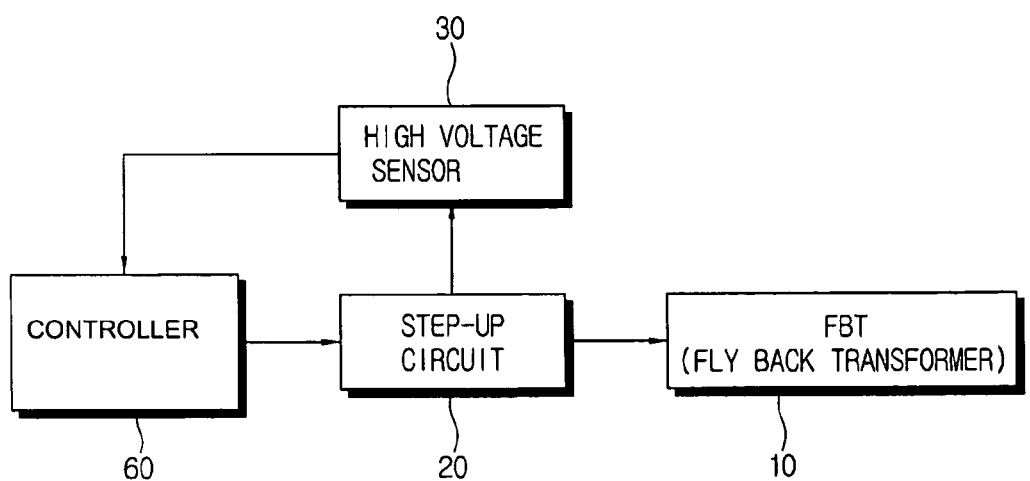
FIG. 2 is a block diagram of a CRT display, according to an embodiment of the present invention.

FIG. 2 is a block diagram of a CRT (Cathode Ray Tube) display, according to an embodiment of the present invention.

As illustrated in FIG. 2, the CRT display device comprises a FBT (Fly Back Transformer) 10, a step-up circuit 20, a high voltage sensor 30, and a controller 60.

The FBT 10 increases an input voltage to a high output voltage, and outputs the high output voltage to an anode (not shown), a focus grid, and a control grid (not shown) of the CRT display.

The step-up circuit 20 amplifies a predetermined input voltage, so as to output an amplified voltage to a primary coil of the FBT 10. The high voltage sensor 30 senses the amplified input voltage output by a transistor of the step-up circuit 20 and outputs the sensed input voltage to the controller 60.

The controller 60 applies a switching voltage signal to the transistor of the step-up circuit 20 so as to control the voltage level output from the step-up circuit 20. Also, the controller 60 receives a predetermined voltage from the high voltage sensor 30 and controls the input voltage of the step-up circuit 20 to be dropped if the predetermined voltage is higher than a predetermined dangerous voltage. The controller 60 can also control the CRT display device to be operated in a power saving mode of Display Power Management Signaling (DPMS), and can maintain the switching signal applied to the transistor of the step-up circuit 20 to be in an off state.

The high voltage sensor 30 senses the voltage output from the step-up circuit 20 and outputs the sensed voltage to the controller 60. Then the controller 60 determines whether the sensed voltage is higher than a normal voltage, e.g., due to a malfunctioning of the CRT display, so as to control the dropping of the input voltage to the step-up circuit 20.

The high voltage sensor 30 may directly sense the input voltage of the step-up circuit 20 and may measure voltages formed in other nodes, so as to output the sensed voltages to the controller 60. Controller 60 compares the sensed voltages to predetermined dangerous voltages, to detect a malfunction of the CRT.

Further, the high voltage sensor 30 may sense the voltage output from the FBT 10 or applied to the FBT 10 from the step-up circuit 20 and output the sensed voltage to the controller 60.

Figure 3:
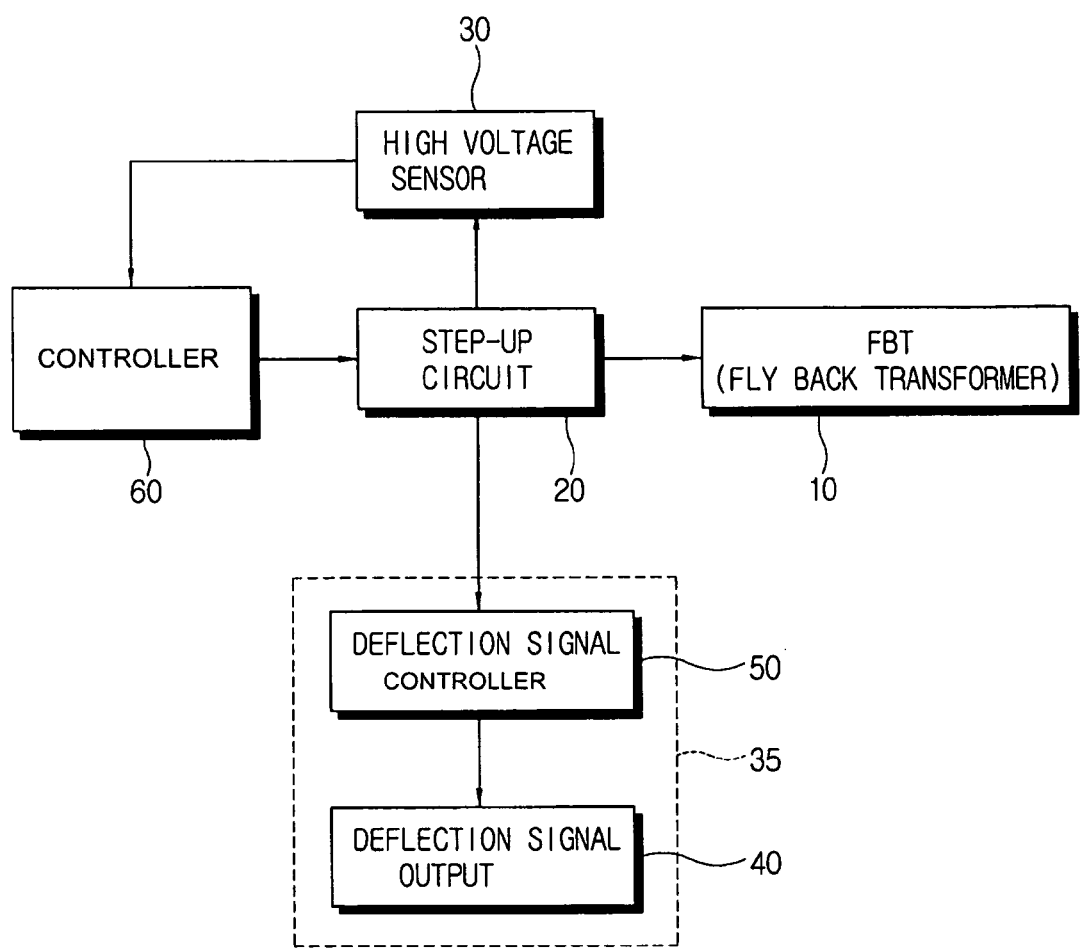
FIG. 3 is a block diagram of a CRT display, having an integral regulation circuit, according to another embodiment of the present invention.

FIG. 3 is a block diagram of a CRT having an integrated high voltage regulating circuit, according to another embodiment of the present invention.

As illustrated in FIG. 3, the integrated high voltage regulating circuit can have a similar configuration as the CRT illustrated in FIG. 2, except that a deflection circuit 35 has been added in the present embodiment.

The deflection circuit 35 includes a deflection signal output 40 and a deflection signal controller 50.

The deflection signal output 40 receives a sawtooth shaped current signal from the step-up circuit 20 and outputs a deflection signal, deflecting the electron beam from the electron gun (not shown). Such a deflection signal deflects a flow of electrons to control the scanning of the electron beam across the screen of the CRT.

The deflection signal controller 50 controls the flow of current supplied by the step-up circuit 20 to the deflection signal output 40, thereby controlling the amount of deflection of the electron beam, as well as the variation of the deflection.

As an example of a potential malfunction of the CRT system, if the deflection signal controller 50 stops operating while the step-up circuit 20 is continuously operating, then a predetermined high voltage will likely be supplied to the Fly Back Transformer (FBT) and the deflection signal output 40. In that case, the controller 60 senses the malfunction and properly drops the input voltage of the step-up circuit 20. In this manner, the controller 60 controls the deflection signal controller 50 to be operated normally, thereby dropping the input voltage of the step-up circuit 20.

Figure 4:
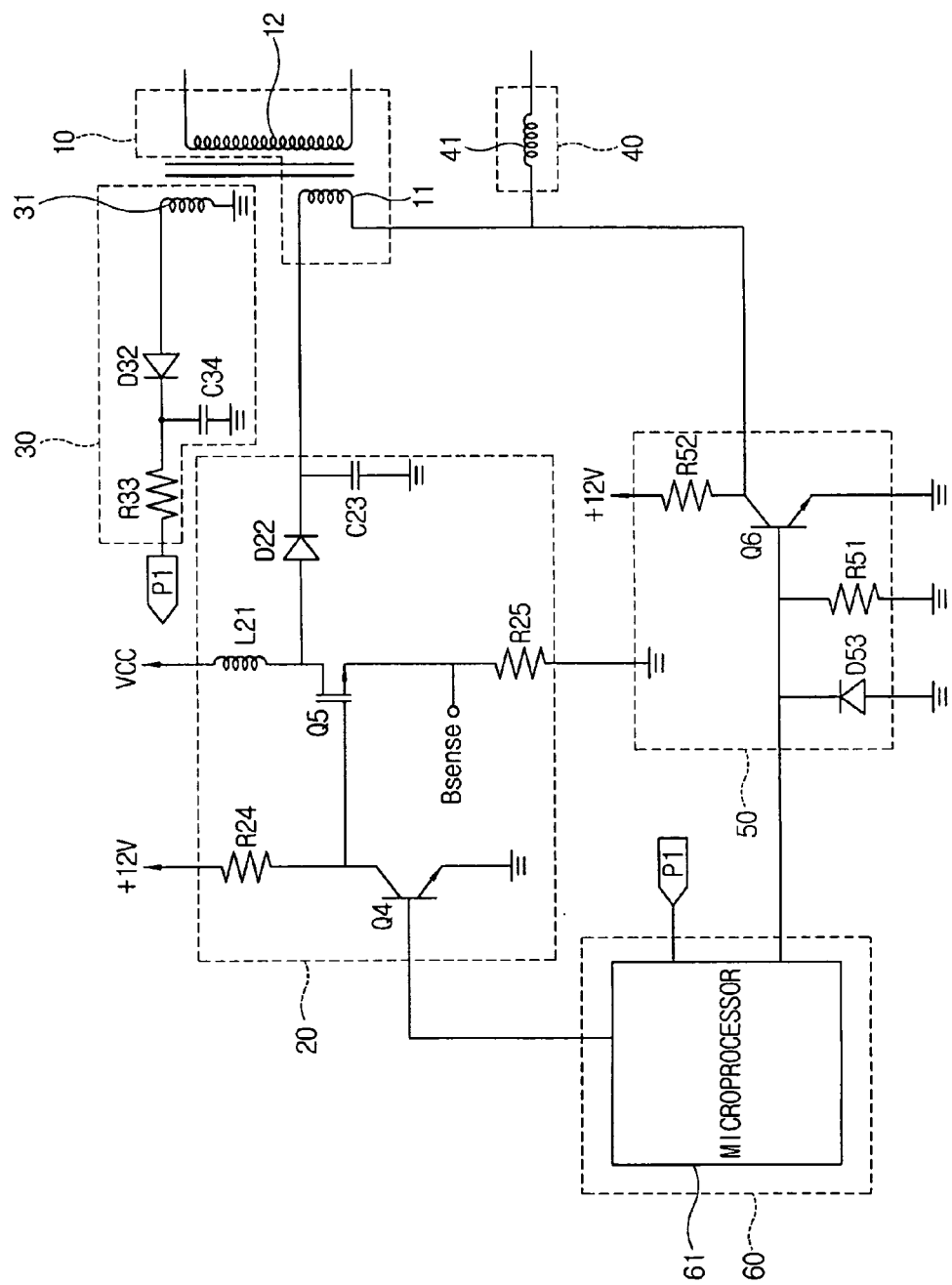
FIG. 4 illustrates a circuit diagram of the CRT display, according to still another embodiment of the present invention.

FIG. 4 illustrates a circuit diagram of a CRT display, according to another embodiment of the present invention.

As illustrated in FIG. 4, the CRT display may include a the Fly Back Transformer (FBT) 10, the step-up circuit 20, the high voltage sensor 30, the deflection signal output 40, and the deflection signal controller 50, and a controller 60.

The FBT 10 has a primary conductive coil 11 and a secondary conductive coil 12, and transfers a high voltage to the secondary coil 12, which is being coupled, with a high turn ratio, to the primary conductive coil 11. The voltage output by the secondary conductive coil 12 is applied to the anode of the CRT display.

The step-up circuit 20 may include a BJT Q4, a MOSFET Q5, a diode D22, pull-up resistors R24 and R25, a capacitor C23, and an inductor L21.

A signal generated according to a PWM signal applied to the BJT Q4 is sequentially applied to a gate terminal of the MOSFET Q5 as a control signal switching the MOSFET Q5. The PWM signal applied to the BJT Q4 is a waveform designed to alternate between a zero duty level and a half duty level. When the MOSFET Q5 is in an off state, that is, when the PWM signal applied to the BJT Q4 is in the zero duty level, the capacitor C23 is charged with a voltage applied to a drain terminal of the MOSFET Q5. On the other hand, when the PWM signal is in the half duty level, the voltage charging the capacitor C23 is increased by an electromotive force stored in the inductor L21. For example, when the voltage applied to the drain terminal of the MOSFET Q5 is 50V, a voltage of the capacitor C23 is 50V if the PWM signal is in the zero duty level, but the voltage of the capacitor C23 increases to 160V or 180V, for example, if the PWM signal is at the half duty level.

A main role of the pull-up resistor R25 is to inform a deflection control integrated circuit (IC), which may be embodied in controller 60, and which controls the deflection, that the MOSFET Q5 is in an on-state. If current is flowing through the pull-up resistor R25 during the on-state of MOSFET Q5, the voltage at Bsense increases. Thus the deflection control IC senses the voltage at Bsense and controls it to be a high voltage by changing the on/off state of the MOSFET Q5.

The step-up circuit 20, focusing on the MOSFET Q5, is efficient for controlling the high voltage. The voltage in the capacitor C23 is flexibly changed, corresponding to a frequency varying from 31 kHz to 70 kHz, for example, and a maxmum/minmum load amount of the electron beam, thereby changing the high voltage.

A longer on-duty state of the MOSFET Q5 results in increasing magnetic force conducted in the inductor L21. Thus, the voltage in the capacitor C23 can be changed by the on-duty state of the MOSFET Q5. The voltage in the capacitor C23 is transferred to the primary coil 11 of the FBT 10 and supplied to a deflection coil 41.

The high voltage sensor 30 may include a conductive coil 31, a diode D32, a resistor R33, and a capacitor C34.

The conductive coil 31 is coupled by a comparatively small turn ratio to the secondary conductive coil 12 of the FBT 10. The voltage applied to the secondary coil 12 is thereby dropped and applied to the conductive coil 31 at a lower voltage, based on the turn ratio.

The diode D32 prevents the current from flowing backward. The resistor R33 and the capacitor C34 make up a Low Pass Filter (LPF) for removing a ripple from a voltage stored in the conductive coil 31 and outputting the ripple-removed voltage to a microcomputer 61.

The deflection signal output 40 may include the deflection coil 41. A magnetic field generated by the sawtooth shaped current flowing through the deflection coil 41 deflects an electric charge of the electron beam, enabling the scanning of the electron beam across the CRT screen.

The deflection signal controller 50 may also include a BJT Q6, pull up resistors R51 and R52, and a damper diode D53.

The BJT Q6 receives a predetermined switching signal in a base terminal and the damper diode D53 prevents the sawtooth shaped current from oscillating during the flyback period.

The deflection signal controller 50 controls the voltage or the current applied to the deflection signal output 40. The current flowing through the deflection coil 41 flows to a ground terminal connected with an emitter of the BJT Q6 when the BJT Q6 is on.

The controller 60 includes the microcomputer 61, and the microcomputer 61 includes a high voltage sensor port P1, receiving the high voltage from the high voltage sensor 30, and an output terminal outputting switching signals controlling the transistors Q4 and Q6 of the step-up circuit 20 and the deflection signal controller 50, respectively.

If the switching signal is not applied to the transistor Q6, of the deflection signal controller 50, from the microcomputer 61 because the system is malfunctioning in the relay, and the like, an electromotive force of the inductor L21 will increase by a predetermined amount responding to an operation of the step-up circuit 20. Such electromotive force causes the voltage of the capacitor C23 to increase, resulting in the high voltage being applied to the primary conductive coil 11 of the FBT 10, such that the secondary conductive coil 12, and the conductive coil 31 of the high voltage sensor 30, generate higher voltages than normal. This phenomenon may occur because the switching signal from microcomputer 61 stops being output to the deflection signal controller 50, causing energy supplied to the step-up circuit 20 to be accumulated in the inductor L21, which does not dissipate through the ground terminal connected with the transistor Q6.

Accordingly, the high voltage sensor 30 then outputs an abnormally high voltage signal, induced in the conductive coil 31 through the LPF, to the high voltage sensor port P1 of the microcomputer 61. The microcomputer 61 thereby detects the malfunctioning of the system when the voltage at the high voltage sensor port P1 is higher than a predetermined dangerous voltage, and, accordingly, stops outputting the control signal switching the step-up circuit 20, thereby turning transistor Q4 off, for example.

As described above, the controller 60 also enables the display device to be operated in DPMS (Display Power Management Signaling) mode, and supplies the switching signal to the transistor Q6 of the deflection signal controller 50, enabling the transistor Q6 to remain in the on state during a predetermined period, and also applies a normal switching signal when the voltage sensed in the high voltage sensor 30 drops below a predetermined voltage.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A Cathode Ray Tube (CRT) display, comprising:
a Fly Back Transformer (FBT) with a conductive coil;
a step-up circuit supplying a predetermined power to the FBT;
a high voltage sensor sensing a voltage output from the step-up circuit; and
a controller receiving the sensed voltage and controlling an input voltage of the step-up circuit to be dropped when the sensed voltage is higher than a predetermined dangerous voltage.

2. The CRT display of claim 1, further comprising,
a deflection signal output to which is applied a predetermined deflection voltage from the step-up circuit; and
a deflection signal controller controlling an application of the applied deflection voltage from the step-up circuit to the deflection signal output,
wherein the controller drops the input voltage applied to the step-up circuit when the step-up circuit continuously supplies power to the FBT without the deflection signal controller controlling the application of the applied deflection voltage to the deflection signal output.

3. The CRT display of claim 2, wherein the controller outputs a predetermined control signal to the deflection signal controller to enable the deflection signal controller to control the deflection voltage applied to the deflection signal output, thereby dropping the input voltage to the step-up circuit, when the sensed voltage is higher than the dangerous voltage.

4. The CRT display of claim 1, wherein the high voltage sensor senses a voltage supplied to the FBT from the step-up circuit, and outputs the supplied voltage to the controller as the sensed voltage.

5. The CRT display of claim 1, wherein the high voltage sensor comprises a coil coupled to the conductive coil of the FBT, and senses a voltage conducted to the coupled coil, so as to output the sensed coupled coil voltage to the controller as the sensed voltage.

6. The CRT display of claim 5, wherein the controller controls the CRT display to be operated in a Display Power Management Signaling (DPMS) mode when the sensed voltage is higher than the dangerous voltage, to drop the input voltage applied to the step-up circuit.

7. The CRT display of claim 1, wherein the controller controls the CRT display to be operated in a Display Power Management Signaling (DPMS) mode when the sensed voltage is higher than the dangerous voltage, to drop the input voltage applied to the step-up circuit.

8. The CRT display of claim 1, wherein the step-up circuit further comprises a switching transistor controlling the supply of power to the FBT.

9. The CRT display of claim 8, wherein the high voltage sensor senses a voltage at the switching transistor to determine whether the transistor is on.

10. A method of controlling a Cathode Ray Tube (CRT) display, comprising:
sensing a voltage output from a step-up circuit of a Fly Back Transformer (FBT); and
controlling an input voltage of the step-up circuit to be dropped when the sensed voltage is higher than a predetermined voltage.

11. The method of claim 10, further comprising,
applying a deflection voltage from the step-up circuit to a deflection signal output to control an electron beam deflection of the CRT,
wherein the input voltage applied to the step-up circuit is dropped when the step-up circuit continuously supplies power to the FBT without a use, by the deflection signal output, of the deflection voltage from the step-up circuit being controlled by a deflection signal controller, controlling the deflection signal output.

12. The method of claim 11, further comprising controlling a deflection signal controller to control usage, by a deflection signal output, of a deflection voltage, from the step-up circuit, by dropping the input voltage to the step-up circuit, when the sensed voltage of the output of the step-up circuit is higher than the predetermined voltage.

13. The method of claim 10, further comprising sensing a voltage supplied to the FBT from the step-up circuit and outputting the supplied voltage as the sensed voltage of the output of the step-up circuit.

14. The method of claim 10 further comprising sensing a voltage of a coil coupled to a conductive coil of the FBT and outputting the sensed coupled coil voltage as the sensed voltage of the output of the step-up circuit.

15. The method of claim 14, further comprising controlling the CRT display to be operated in a Display Power Management Signaling (DPMS) mode, when the sensed voltage of the output of the step-up circuit is higher than the predetermined voltage, to drop the input voltage applied to the step-up circuit.

16. The method of claim 10, further comprising controlling the CRT display to be operated in a Display Power Management Signaling (DPMS) mode, when the sensed voltage of the output of the step-up circuit is higher than the predetermined voltage, to drop the input voltage applied to the step-up circuit.

17. The method of claim 10, further comprising controlling a supply of power to the FBT from the step-up circuit using a switching transistor in the step-up circuit.

18. The method of claim 17, further comprising sensing a voltage at the switching transistor to determine whether the switching transistor is on.

* * * * *